United States Patent [19]

Draxler

[11] 3,715,650
[45] Feb. 6, 1973

[54] PULSE GENERATOR FOR IGNITION SYSTEMS

[75] Inventor: James R. Draxler, Fond du Lac, Wis.

[73] Assignee: Brunswick Corporation, Chicago, Ill.

[22] Filed: Nov. 23, 1971

[21] Appl. No.: 201,456

[52] U.S. Cl. ............. 322/51, 123/148 E, 123/149 R, 310/70 R, 310/70 A, 315/209 SC, 315/218, 322/91
[51] Int. Cl. ................................................ F02p 1/00
[58] Field of Search ..... 310/70 R, 70 A, 156; 322/51, 322/91, 94; 315/209 SC, 218; 213/148 R, 148 E, 148 F, 149 R

[56] References Cited

UNITED STATES PATENTS

| | | | |
|---|---|---|---|
| 3,219,877 | 11/1965 | Konopa | 315/218 X |
| 3,577,971 | 5/1971 | Cavil | 310/70 X |
| 3,566,188 | 2/1971 | Minks | 315/218 X |
| 3,530,366 | 9/1970 | Schwarm | 322/91 X |

Primary Examiner—J. D. Miller
Assistant Examiner—H. Huberfeld
Attorney—Eugene R. Sawall

[57] ABSTRACT

A capacitor discharge ignition includes a pulse generator coupled to an engine establish pulse signals to trigger a thyristor at all speeds including engine cranking speed. The generator includes a permanent magnet rotor formed in a continuous doughnut shape having planar faces, with 180° axially polarized with one polarity and the opposite 180° directly oppositely polarized. Circumferential pole shoes of slightly less than 180° in length are centrally secured to the top and bottom of each magnet and project radially therefrom. A common pick-up winding is wound on a generally U-shaped core which opens toward the rotor with the ends of the arms aligned with and adjacent the outer edges of upper an lower shoes. The rotation of the rotor results in the reversal of flux within the pick-up core at each of the abutting sections with the corresponding single polarity pulse being generated as the rotor moves by the U-shaped core.

10 Claims, 4 Drawing Figures

PATENTED FEB 6 1973 3,715,650
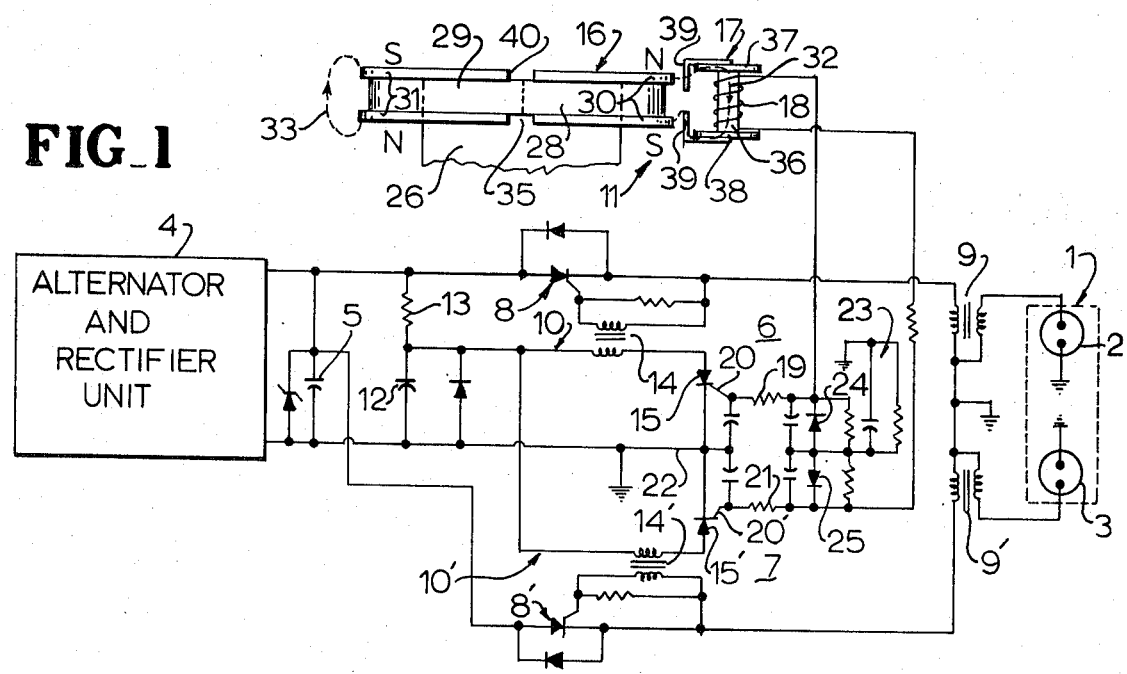
FIG.1
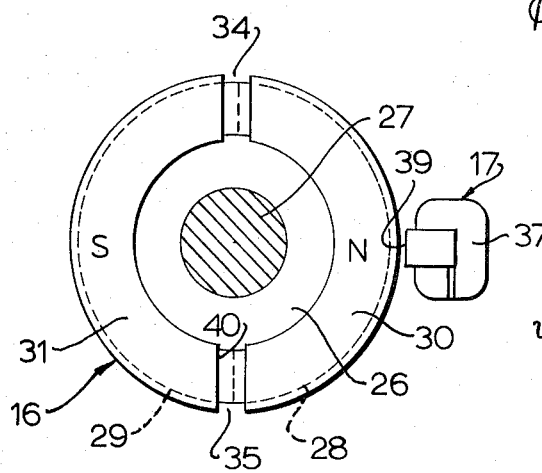
FIG.2
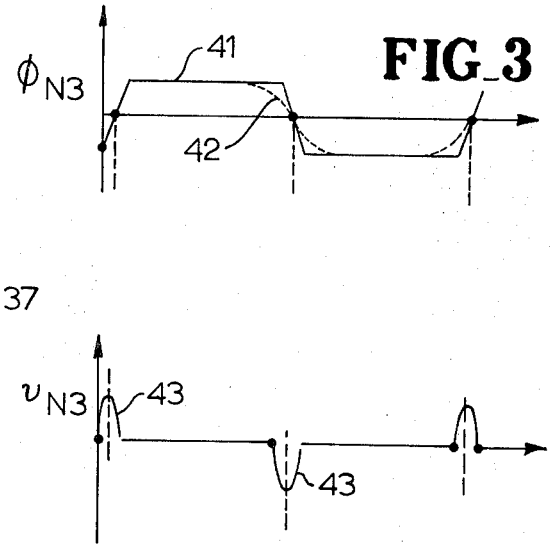
FIG.3
FIG.4
INVENTOR.
JAMES R DRAXLER

PULSE GENERATOR FOR IGNITION SYSTEMS

BACKGROUND OF THE INVENTION

This invention relates to a pulse generator and particularly to a rotary pulse generator adapted to establish time spaced triggering pulses of alternate polarity.

Certain circuit applications may require generation of time spaced, triggering electrical pulses of alternating or opposite polarity. For example, solid state ignition systems particularly of a capacitor discharge variety have recently been designed with a triggered solid state switching device transferring the power for firing of the spark plugs of internal combustion engines. For example, U.S. Pat. No. 3,566,188 discloses an alternator driven capacitor discharge ignition system for a two cylinder engine wherein a main alternator is coupled to the drive shaft of the engine with the output operatively connected to charge a main firing capacitor. The energy of the capacitor is rapidly discharged and transferred through a pair of controlled rectifiers and pulse transformers to the spark plugs for the alternate firing of the spark plugs associated with the two cylinder engine. The controlled rectifiers are gated or actuated from a separate generator also driven in synchronism with the engine and producing time spaced pulses of opposite polarity. In the trigger generator, a single trigger coil is provided as a common pick-up for firing of the control rectifiers. The rotor of the trigger generator includes a pair of diametrically mounted permancent magnets which are polarized in an opposite direction with respect to the pick-up coil to thereby generate the opposite polarity trigger pulses. An alternative possible rotor structure is shown in issued U.S. Pat. No. 3,577,971 wherein a pair of radially polarized magnets are provided with the circumferential ends in abutting or slightly spaced relation in combination with pole pieces for providing a discontinuity or fringing area. The advantage of this latter structure is the generation of a pulse of a single polarity as the junction or ends of the pole pieces move past the common pick-up coil. The rotation of the rotor is associated with the generation of alternate polarity pulses to provide for the desired firing of the spark plugs. Multiple cylinder engines employing more than a pair of cylinders may be similarly controlled by additional coils and rearrangement of the gap or gaps of the respective magnets to properly position the pulses with respect to the angular position of the crankshaft in order to provide for the proper sequential firing.

Although such systems provide certain advantages, they have not been found to provide optimum triggering control. The U.S. Pat. No. 3,566,188 provides slight trailing and leading pulses which may introduce instability into the circuit. The prior art systems, such as shown, do not produce as significant an output as desired for reliable and positive triggering of the control rectifiers and the like over the desired range. Thus, particularly as applied to outboard motor engines and the like, the ignition should operate at very low rotational speed, for example, at 80 revolutions per minute and the like.

Generally, the prior art systems have not produced the desired ignition reliability at such minimal speeds.

Summary of Present Invention

The present invention is particularly directed to a simple and reliable improvement in the structure of a pulse generator to produce time spaced pulses which have a substantial amplitude even at very low cranking speeds and with a relatively large air gap between the rotating and stationary part. The present invention, as a result of these features, provides reliable switching of an ignition system at very low cranking speeds and insensitivity to mechanical deflections of the crankshaft mounted rotating member.

The ability to work with a large air gap is possible because of the use of an efficient low reluctance iron path for the entire magnetic circuit except the necessary air gap between the moving and stationary parts.

Some mechanical deflections are always present in any lightweight high output internal combustion engine due to gas load deflection and the effect of rotating masses. In any velocity sensitive pulse generator of this type, any relative lateral motion between the magnet and pick-up coil induces an output in the pick-up coil regardless of the rotor position and whether or not it is turning. If a relatively short gap is provided in order to produce a large trigger pulse, a false trigger signal induced by the mechanical deflection can cause a mistimed firing of the ignition system and engine damage.

The large clearance gap used in this system between the stationary and rotating parts of the pulse generator minimizes any such false trigger signal and renders these deflections harmless. This is true since any given deflection which will normally be encountered is a much smaller percentage of the large air gap than it is for a small gap and the reluctance change in the flux path is correspondingly small. Each pulse is of a single polarity and the sequential pulses are of alternate polarity. Generally, in accordance with the present invention, a plurality of circumferentially extended magnets are provided with the adjacent ends abutting or in closely spaced relation and mounted for rotation on an axis normal to the principal plane of the magnets. Generally, the magnets are coplanar with the discontinuity formed at the abutting or closely adjacent ends. In accordance with the teaching of the present invention, each of the extended magnets defining the essentially continuous magnetic path is magnetized in the axial direction with adjacent magnets being oppositely polarized. Applicant has found that the polarity reversal results in a generation of a flux pattern with a single rapid change with a resulting single pulse generation at each of the abutting ends of the adjacent magnets. Applicant has further found that this structure maintains the desired polarity pulses while producing a relatively high amplitude pulse signal which contributes significantly to reliable triggering of solid state devices, while maintaining insensitivity to normal engine deflections, such as the thyristors, particularly at cranking speeds of the engine.

In a preferred construction as applied to a two cylinder ignition system, the magnets of the rotor are formed in a continuous doughnut or annular shaped element having planar faces, with 180° axially polarized with one polarity and the opposite 180° axially oppositely polarized. Circumferential pole pieces or shoes are secured to the top and bottom of the magnets and project radially therefrom. The pole shoes have an extent of slightly less than 180° to space the ends of the pole pieces circumferentially at each abutting joint. A common pick-up winding is wound on a generally U-shaped core which opens toward and is aligned with the periphery of the rotor such that the ends of the arms are aligned with and adjacent the outer edges of upper and lower shoes of the peripheral rotor surface. The rotation of the rotor results in the reversal of flux within the pick-up core at each of the abutting sections with the corresponding single polarity pulse being generated as the rotor moves by the U-shaped core.

The present invention has been found to provide a relatively high level and sharply defined triggering pulse which is particularly suited to drive the cascaded pilot controlled gated switch for discharging of a trigger capacitor into the gate of a main firing capacitor.

BRIEF DESCRIPTION OF THE DRAWING

The drawing furnished herewith illustrates a preferred construction of the present invention in which the above advantages and features are clearly disclosed, as well as others, which will be readily understood from the following description.

In the drawing:

FIG. 1 is a schematic circuit diagram including a pulse generator constructed in accordance with the present invention with the output of the pulse generator connected to control a capacitor discharge ignition system;

FIG. 2 is a top plan view of the generator shown in FIG. 1;

FIG. 3 is a graphical illustration of the flux change associated with the pulse generator of FIGS. 1 and 2; and FIG. 4 is a graphical illustration of the pulse generated in the pulse generator as a result of the flux change shown in FIG. 3.

DESCRIPTION OF THE ILLUSTRATED EMBODIMENT

Referring to the drawing and particularly to FIG. 1, the present invention is shown as a part of and controlling an ignition circuit for a two cylinder internal combustion engine 1 having a pair of spark plugs 2 and 3. For example, the present invention has been applied to such an engine forming a part of an outboard motor and the like. An alternator 4 is coupled to and driven in synchronism with the engine 1, with the output of the alternator connected to charge a main firing capacitor 5. Parallel connected discharge circuits 6 and 7 interconnect the firing capacitor directly to the spark plugs 2 and 3 to provide for a distributorless and contacterless ignition system. The illustrated ignition circuit essentially corresponds to that shown in the previously referred to U.S. Pat. No. 3,566,188 and includes similar discharge circuits 6 and 7 which are briefly described herein with circuit 6 particularly described and the corresponding elements of circuit 7 identified by corresponding prime numbers. Thus, the circuit 6 includes a silicon control rectifier 8 defining a triggered switch means connected in series with a pulse transformer 9 across the main firing capacitor 5. A pulse forming network 10 is connected to selectively supply a firing pulse to the gate circuit of the control rectifier 8 in response to the output of a pulse generator 11 which particularly forms the subject matter of the present invention. Generally, the pulse forming network 10 includes an auxiliary or common triggering capacitor 12 which is connected in series with an isolating resistor 13 across the main firing capacitor 5 and thus also the output of the alternator 4. Thus the capacitor 12 is charged simultaneously with the main firing capacitor. The illustrated network 10 further includes a pulse transformer 14 connected in series with a pilot or an auxiliary controlled rectifier 15 connected directly across the capacitor 12. The controlled rectifier 15 in turn is actuated by the output of the pulse generator 11 to provide for proper timed firing of the controlled rectifier 15 and discharging of the capacitor 12 through the related controlled pulse forming networks 10 and 10'.

The present invention is particularly directed to the pulse generating means 11 which is operatively connected into the circuit to control and actuate the switch 8 and in the preferred structure through the current or conduction control elements of the triggered switch means shown as controlled rectifiers 15 and 15'.

The pulse generating means 11 of the present invention includes an especially constructed rotor unit 16 coupled to a pick-up or trigger coil unit 17 which is connected to the gates of the pilot rectifiers 15 and 15'.

The pick-up coil means 17 includes a single winding or coil 18 having one end connected in series with a resistance 19 to the gate 20 of one pilot controlled rectifier 15 and the opposite end of the winding 18 connected in series with the resistance 21 to the gate 20' of the second pilot controlled rectifier 15'. A return path is preferably constructed in accordance with the teaching of the copending application of Arthur O. Fitzner entitled IGNITION SYSTEM WITH ADVANCE STABILIZING MEANS which was filed on Nov. 23, 1971, with Ser. No. 201,457 and is assigned to the assignee of this application. The cathode of the respective rectifiers is connected through a common ground line 22 in series with a self-biasing network 23 to the common junction of a pair of return diodes 24 and 25. The anodes of diodes 24 and 25 are connected in common to the biasing network 23 and the cathodes are connected respectively to the opposite ends of the single winding 18. Thus, the trigger power return path is always completed through the bias network 23 and one or the other of the diodes 24 or 25 to the relatively negative end of the winding 18.

More particularly, the rotor unit 16 includes a central hub support 26 which is adapted to be connected to the output shaft 27 of engine 1 and/or otherwise rotatably mounted and driven in synchronism with such output shaft to establish timed movement with respect to the crankshaft and pistons of the internal combustion engine 1. The rotor unit can also be integrally formed with the engine flywheel unit of a small two cycle engine such as employed in outboard motors, snowmobiles and the like. A pair of permanent magnets 28 and 29 are provided and secured to the support to define a continuous annular or doughnut shaped permanent magnet assembly. The magnet assembly can be formed of any suitable permanent magnet material such as a conventional ferrite or other alloys which have a relatively high retentivity. The magnets may be separately formed as a pair of semicircular 180° sections with their end faces in abutting relation or a single continuous element may have opposite 180° sections polarized to define the magnet pair. In accordance with the present invention the magnets 28 and 29 are axially polarized and oppositely polarized with respect to each other. Thus the one magnet 28, as viewed in FIG. 1, is axially polarized to define a North pole in the upper face and the South pole in the lower face with the flux return path downwardly about the periphery. Similarly, the second magnet 29 is oppositely polarized with the North pole on the bottom surface and the South pole on the top surface such that it establishes a similar vertically directed flux path. However, the flux of the magnet is from the lower face of the magnet 29 to the upper face.

The respective field are concentrated through the use of semicircular pole shoes, with a separate pair of pole shoes 30 and 31 being secured respectively to each magnet 28 and 29. Each pair of shoes includes corresponding magnetic steel sectors which are clamped into abutting engagement with the opposite pole faces of the corresponding magnet. The peripheral edge of each shoe similarly projects outwardly from the corresponding magnet such that the actual flux path with respect to the magnets is through the pole pieces to the peripheral edge and then vertically to the opposite pole piece as shown at 32 and 33.

The pole pieces are slightly less than 180° in circumferential length and thus define high reluctance gaps 34 and 35 between their respective ends.

The common pick-up coil 18 is shown wound on a generally U-shaped core 36 which opens toward the periphery of the rotor assembly. The U-shaped core 36 thus includes upper and lower arms 37 and 38 joined on the outer end by a continuous core member upon which the winding 18 is wound. The inner ends of the pole arms 37 and 38 have inwardly projecting pole pieces 39 projecting toward each other in alignment with the peripheral edge of the pole shoes. The coil unit 17 is mounted with the pole arms spaced slightly from the peripheral edge of the pole shoes 30 and 31. The magnetic path for the aligned magnet 28 or 29 and the related shoes passes through the arms and core from the north magnetic to the south magnetic shoe. Each complete revolution of the rotor presents and establishes an alternating flux through the core, generally as shown in accordance with the illustration of FIG. 3 with a resulting voltage induced in the coil 18 as a result of the flux pattern, as shown in FIG. 4. The magnetic field presented between the edges of each pair of shoes is of a constant polarity and amplitude. This constant flux does not generate a signal in coil 18. As the rotor unit aligns and moves the gap portions past coil 18, however, the flux through coil 18 reverses and generates a pulse signal. As a result of the removal of the shoe portions at the ends of magnets 28 and 29, the flux through the coil 18 changes rapidly to a minimal or inconsequential field between the two pole pieces and then rapidly rises in the opposite direction. Generally, the flux pattern of the magnets 28 and 29 and the flux pattern presented at shoe edges and coupled to the winding 18 about the circumference of the rotor unit is as shown in FIG. 3. The zero or starting point in the graphical illustration corresponds to the edge 40 of the magnet 29 as shown in FIG. 2, with movement counterclockwise. The trace of the magnets 28 and 29 is shown by the full line idealized curve 41 and the modification thereof by shoes 30 – 31 by the dashed curve 42. Thus, at the top shoe edge 40, a maximum negative flux appears which linearly decreases to the abutting joint between the two magnets and fields. There is essentially a zero field at the abutting joint which will increase to maximum positive level at the edge of the shoe 30. The flux will then maintain a maximum positive level until the opposite edge of the shoe 30 is passed, at which time the flux will rapidly decrease to the zero level and increase in the negative direction when again encountering shoe 31. As the edge of the opposite pole shoe is encountered the flux had increased in the opposite direction to the maximum negative or opposite level and is maintained during traverse of the pole shoes.

The portion of the coil and the efficient low reluctance iron magnetic path, except for the necessary air gap, provides for maximum change in the flux and thus results in a significant pulse which, particularly in combination with the cascaded connection to the main rectifier, provides for reliable discharging of the capacitor and firing of the engine. Further, the pulse characteristic is such that Applicant has found that the air gap can be made relatively large without any degradation in the operating characteristic of the ignition system. Thus, the air gap may be of the order of 0.060 inches. The change in such an air gap as a result of the mechanical deflections encountered in lightweight high output internal combustion engines does not induce a significant signal in the pick-up coil and thus will not result in misfiring. The present invention is, thus, particularly significant when applied to engines such as employed in outboard motors and the like.

The field as presented to the coil 18 is generally as shown by the trace 42 where the effect of the shoes 30 – 31 and the spacing of the unit 17 modifies the flux pattern at the gaps 34 and 35 as they are moved relative to coil 18. In particular, the construction produces a curved transition from and to the maximum flux levels with a rapid movement through zero and a maximum slope adjacent to the immediate abutting joint area. Each flux change in coil 18 results in a pulse signal as shown at 43 in FIG. 4, with the amplitude thereof proportional to the speed of the relative movement between the rotor unit 16 and the winding unit 17. The polarity of each pulse is directly related to the direction of the flux change. The results is a train of single polarity pulses which are time spaced in accordance with the alignment of the abutting areas with the coil unit 17 and thus in accordance with the rotational speed of the rotor unit 16.

The axial polarization of the magnets 28 and 29 in combination with the mounting of the coil assembly adjacent the periphery maximizes the flux flow in the coil assembly. Further, the construction results in a very significant change in the flux in the coil as the rotor moves the adjacent ends of the two distinct magnets past the coil and has been found to reliably generate pulse signals of sufficient amplitude at the usual cranking speed of outboard motors to provide an unusually satisfactory and reliable triggering of the controlled rectifiers, particularly when the cascaded pilot and main rectifiers are employed. The winding may, of course, be connected directly to the main rectifiers 8 or other switch means within the broadest aspect of the invention.

The pulse generator with the axially polarized magnets can, of course, be rearranged and constructed to provide a similar direct firing of any internal combustion engine by suitable arrangement of the abutting joint in combination with the appropriate number of coils, with each coil being connected to fire a pair of spark plugs.

Various modes of carrying out the invention are contemplated as being within the scope of the following claims, particularly pointing out and distinctly claiming the subject matter which is regarded as the invention.

I claim:

1. A pulse signal generating means for generating time spaced pulses of sequentially alternate polarity, comprising a plurality of magnets mounted in circumferential spacing about an axis of rotation with the magnets maintaining an essentially continuous field about the total periphery of the magnets, a rotatable support having an axis of rotation normal to the principal plane of the plurality of magnets, said magnets being polarized axially of said support with adjacent magnets being oppositely polarized to create a corresponding magnetic reversing field, and a pick-up coil means mounted adjacent the periphery of the plurality of magnets and in the magnetic field established by the magnets to establish a single polarity pulse signal in response to each movement of a reversing field past the coil means.

2. The pulse signal generator of claim 1 having pole shoes secured to the opposite poles of said magnets with the ends of said pole shoes spaced at each abutting magnet joint and with the shoes projecting radially from the face of the edge of the magnets.

3. The pulse signal generator of claim 2 wherein said coil means includes a core having core arms mounted with the ends adjacent to said shoes.

4. The pulse signal generating means of claim 1 wherein said plurality of magnets includes a continuous magnetic member having the circumferential portions magnetized to define said magnets.

5. The pulse signal generator of claim 1 wherein said magnets are mounted with the magnetic ends in abutting relation, and pole shoes are secured to the opposite poles of said magnets with the ends of said pole shoes spaced at each abutting magnet joint and the shoes project radially past a peripheral edge of the magnets, said coil means having a core with a pair of pole arms mounted with the ends of the arms aligned with the projecting edge of said shoes.

6. The pulse signal generating means of claim 1 including a main pulse forming capacitor, a main gated switch means connected to said capacitor and having an input means to control discharge of said capacitor, a pilot gated switch means connected to said input means to control said main gated switch means and having a pilot input means connected to said pick-up coil means.

7. The pulse signal generator of claim 6 having a trigger capacitor connected to said pilot gated switch means and to the input means of said main gated switch means to provide a pulse signal to said main gated switch means in response to actuation of said pilot switch means.

8. The pulse signal generator of claim 7 wherein pole shoes are secured to said magnets and project radially of the edge of the magnet and said coil means includes a core having core arms mounted with the ends adjacent to said shoes to define a low reluctance magnetic path having air gaps of the order of 0.060 inches between the shoes and the core arms.

9. The pulse signal generating means of claim 1 wherein said pick-up coil means includes a low reluctance U-shaped magnetic core having the open portion mounted adjacent the periphery of the plurality of magnets and spaced from the periphery to define air gaps of the order of 0.060 inches.

10. The pulse signal generator of claim 8 having pole shoes secured to the opposite poles of said magnets with the ends of said pole shoes spaced at each abutting magnet joint and with the shoes projecting radially from the face of the edge of the magnets toward said core, and said air gaps being formed between the edges of the shoes and the core.

* * * * *